Oct. 13, 1925.
R. C. CLAPP
1,557,195
TRUCK
Filed Oct. 25, 1924
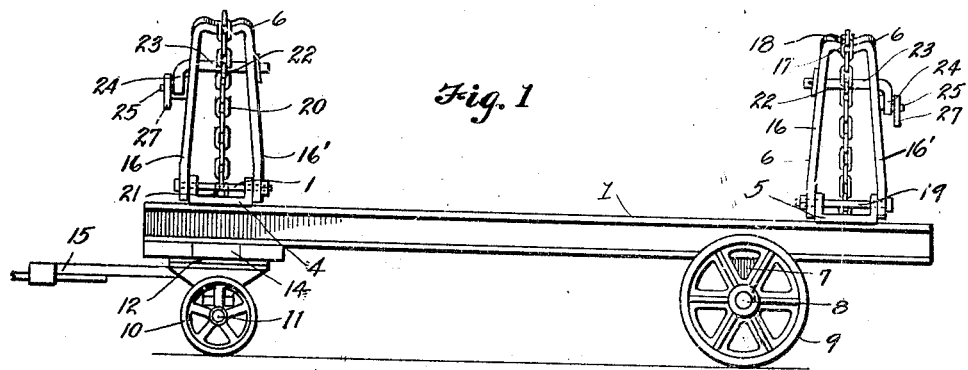
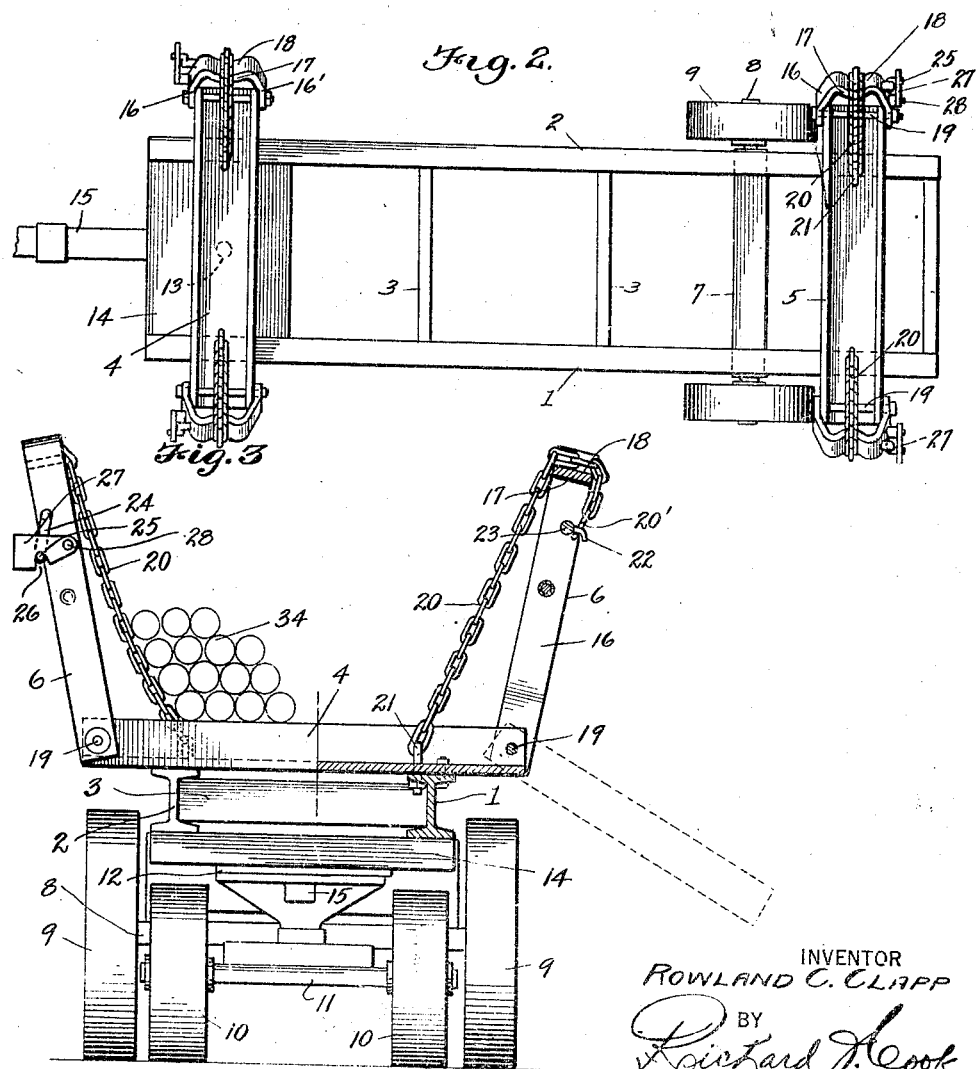
INVENTOR
ROWLAND C. CLAPP
BY
Richard H. Cook
ATTORNEY Patented Oct. 13, 1925.

1,557,195

UNITED STATES PATENT OFFICE.

ROWLAND C. CLAPP, OF PORTLAND, OREGON.

TRUCK.

Application filed October 25, 1924. Serial No. 745,773.

*To all whom it may concern:*

Be it known that I, ROWLAND C. CLAPP, a citizen of the United States, and a resident of Portland, Multnomah County, Oregon, have invented certain new and useful Improvements in Trucks, of which the following is a specification.

This invention relates to improvements in trucks, and more particularly to trucks of that class used on docks, wharves and about ware or freight houses, for the hauling of bulky freight such as iron pipe, iron bars, rails, beams, or the like; the principal object of the invention being to provide a four wheeled truck of the above character, embodying improvements in the construction of standards and their connection with the bolsters of the truck which greatly facilitates the work of unloading and loading.

More specifically stated, the object of the invention resides in the provision of a truck having standards that are hingedly fixed to the ends of the bolsters, so that they may be moved from upright, load supporting position to a downwardly inclined position so as to permit a load to be removed or rolled from the side of the truck as distinguished from being lifted over the standards.

Another object of the invention resides in the provision of chains or the like, attached to the bolsters at points within the pivot points of the standards and adapted to be releasably attached to the upper ends of the latter to retain them in upright position.

Still further objects of the invention reside in the provision of latch mechanism in connection with the supporting means for retaining the standards in functional position.

Other objects reside in the various details of construction and combination of parts embodied in the invention and in their mode of operation.

In accomplishing these and other objects, I have provided the improved details of construction, the preferred forms of which are illustrated in the accompanying drawings, wherein—

Figure 1 is a side view of a truck embodied by the present invention.

Figure 2 is a plan view of the same.

Figure 3 is an enlarged end elevation of the truck with certain parts shown in section for better illustration.

Referring more in detail to the several views of the drawings—

The truck frame preferably is made up of two longitudinally extending I-beams, 1 and 2, joined in spaced relation by means of a plurality of transverse beams 3 and also by two upwardly facing channel beams 4 and 5 located near the oposite ends of the frame; these latter beams serving as bolsters for the load and are extended beyond the beams 1 and 2 and at their ends have the load supporting standards 6 mounted thereon as will presently be described.

The frame structure is mounted at its rearward end upon a transverse beam 7 to which an axle 8, having ground wheels 9 at its ends, is secured, and at its forward end is provided with guide wheels 10 on an axle 11, fixed to a plate 12 that is centrally pivoted as at 13, to a plate 14 secured to and supporting the forward end of the frame beams. A tongue 15 is provided for drawing and steering the truck, and this is attached to the plate 12.

Each of the standards 6 consists of a metal bar that is bent so as to provide two spaced apart leg portions 16—16' of equal length joined at their upper ends in spaced relation by a connecting piece 17 that is bent downwardly so as to provide a sort of seat 18. The lower ends of the legs of the several standards are disposed at opposite sides of the bolsters, at their ends, and are hingedly fixed thereto by means of bolts 19 extended through the vertical flanges of the bolsters; the connection permitting the standards to swing in a vertical plane from an upwardly directed position, as shown in full lines in Figure 3, to a downwardly depending or inclined position, as shown in dotted lines.

As a means of suporting the standards in load carrying, or upright position, I have provided, for each standard, a chain 20 having its lower end anchored, as at 21, to the base of the bolster channel at a point that is substantially within the pivot, or hinge, point of the standard, and having its other end extended upwardly and over the seat 18 at the upper end of the standard and then turned downwardly with its lower end link 20' seated over a downturned hook, or pin, 22 in a cross shaft 23 extended rotatably between the legs of the standard. To prevent rotation of this shaft and the release of the chain from the hook 22, I have provided the cross shaft 23 at one end with a crank arm 24 which in turn is provided at its end with a pin 25 adapted to seat within a downwardly opening notch 26 in a latch plate 27 that is pivotally mounted by means of a bolt 28 fixed in the adjacent leg of the standard. When it is desired to release a chain so that the standard sustained thereby may be swung downwardly for loading or unloading the truck, the latch plate 27 is moved upwardly so as to release the crank pin 25 from the notch.

While I have shown the chains extended up over the ends of the standards, it would be possible to extend them directly over the cross shafts and then attached to the hooks 22, but the manner in which they have been shown is preferred, especially where heavy loads are carried.

Assuming that the truck is constructed as illustrated, and that the standards 6 are supported by the chains 20 in upright position, as shown best in Figure 3, it is apparent that when the load, as indicated at 34 in Figure 3, is placed on the truck and bears outwardly against the chains, the latter tend to draw the standards inwardly instead of placing an outwardly directed pressure thereon. When the truck has been loaded it can be drawn to the point of unloading and then the standards, at one or at both sides released, this being done by forcing the latch plates 27 upwardly to unseat the pins of the crank arms 24 from the notches 26 so that the shafts 23 may rotate sufficiently to release the hooked pins 22 therein from the end links of the anchoring chains.

Skids may be placed upon the beams 1 and 2 on which the load could be lowered to the ground or, if desired, the standards 6 could be used for this purpose.

Trucks of this character could be made in various sizes and of various materials to meet the special purpose for which they are to be used, and since it is readily apparent that various changes in the details of construction could be made without departing from the spirit of the invention, I do not wish to be limited only to those herein shown.

Having thus described my invention, what I claim as new therein and desire to secure by Letters-Patent, is:

1. In a trucking vehicle, a frame, a bolster mounted on the frame, a standard pivotally fixed to the bolster to swing between upwardly and downwardly extended positions; said standard having a depressed seat at its outer end, and an anchor chain, or the like, attached to the bolster and adapted to be extended upwardly over the end of the standard within said seat and to be releasably fastened to the standard to sustain it in upright position.

2. In a trucking vehicle of the class described, a frame, bolsters extending transversely of the frame, standards pivotally fixed at their lower ends to the ends of the bolsters to swing in vertical planes between upwardly inclined load supporting positions and downwardly inclined positions, shafts extended rotatably through the upper ends of said standards, hooks on said shafts, releasable means for normally preventing rotation of the shafts and anchor chains, or the like, attached to the bolsters within the pivot points of the standards and adapted for releasable connection at their upper ends with the hooks of said shafts to sustain the standards in load supporting position.

3. In a trucking vehicle of the class described, a frame, upwardly facing channel iron bolsters fixed to extend transversely of the frame, standards pivotally fixed at their lower ends to the ends of the bolsters, each comprising spaced apart legs and a downwardly depressed connecting portion at their upper ends forming a seat, shafts extended rotatably between the legs of said standards near their ends, and provided with crank arms, hooks on said shafts and anchor chains, or the like, attached to the bolsters within the pivot points of the standards and adapted to be extended upwardly and over the seats of the standards and then downwardly for releasable connection with said hooks and latch plates pivotally fixed to the standards for engagement with said crank arms and releasable therefrom to permit rotation of the shafts and the release of the anchor chains from said hooks.

Signed at Portland, Multnomah County, Oregon, this 30th day of September, 1924.

ROWLAND C. CLAPP.